Oct. 21, 1969    I. M. MILLER    3,474,371

CLAMP AND LAMINATIONS

Filed Dec. 2, 1966

INVENTOR
IMRICH M. MILLER

BY Darby & Darby

ATTORNEYS

United States Patent Office 3,474,371
Patented Oct. 21, 1969

3,474,371
CLAMP AND LAMINATIONS
Imrich M. Miller, Paterson, N.J., assignor to Universal Manufacturing Corporation, Paterson, N.J., a corporation of New Jersey
Filed Dec. 2, 1966, Ser. No. 598,872
Int. Cl. H01f 27/26
U.S. Cl. 336—210   2 Claims

ABSTRACT OF THE DISCLOSURE

A clamp for a stack of laminations of an inductive device in which each lamination is formed by at least two members with each member having a projecting tab and a recess on one of its edges. A clamp having an opening therein whose width is normally less than the distance between the outer edges of the two projecting tabs on two lamination members is placed over the tabs to engage and firmly hold them thereby holding the lamination members together.

---

This invention relates to transformer devices and more particularly to novel clamping arrangements for holding stacks of transformer laminations together.

When constructing transformers, it is usually necessary to provide some device for holding a stack of metal laminations together to form the transformer core. Such laminations appear in a wide variety of configurations. Several widely used ones in the fluorescent ballast field are the so-called T–L laminations and variations thereof, and E–I laminations.

In the past, metal clamps have been extensively used for holding lamination stacks together. While these clamps are generally satisfactory, they have several disadvantages, such as relatively high cost and difficulty of manufacture, relatively high cost of assembly and the noise problems they engender in operation of the transformer.

The present invention is directed to a relatively simple and economical clamp and modified laminations structure for holding laminations and stacks of laminations together. In accordance with the invention, a recessed portion is formed on each of two pieces of metal which are to be located adjacent each other to form a portion of or a complete transformer lamination. A frame-type clamp of suitable material is used which fits in the recessed portions of the laminations pieces and securely holds the pieces together. For stacks of laminations, the size of the cut-out of the frame is selected to hold the pieces of the individual laminations of the stack together as well as holding the laminations in the stack. If desired, the clamp can be made of a suitable insulating material, such as cardboard, so that it also can be used as a terminal board. This, of course, provides a highly economical assembly.

It is, therefore, an object of the present invention to provide a novel transformer lamination and clamp construction.

Another object is to provide a relatively simple clamp made of an insulating material, such as cardboard, for holding stacks of transformer laminations together.

Still a further object is to provide a transformer lamination structure in which adjacent pieces of a lamination have recessed portions for holding a force-fit lamination clamp.

An additional object is to provide a combined transformer lamination clamp and terminal board.

Other objects and advantages of the present invention will become more apparent upon reference to the following specification and annexed drawings, in which.

Figure 1:
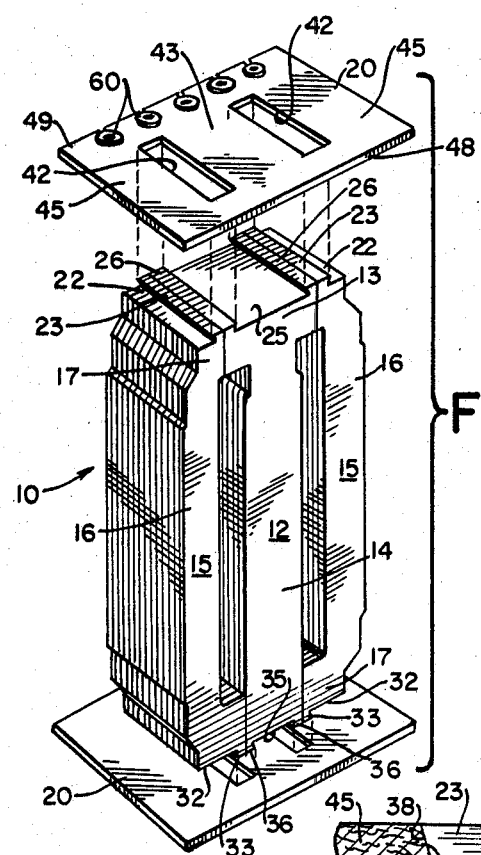
FIG. 1 is an exploded perspective view of one type of transformer lamination and clamp according to the present invention.
Figure 2:
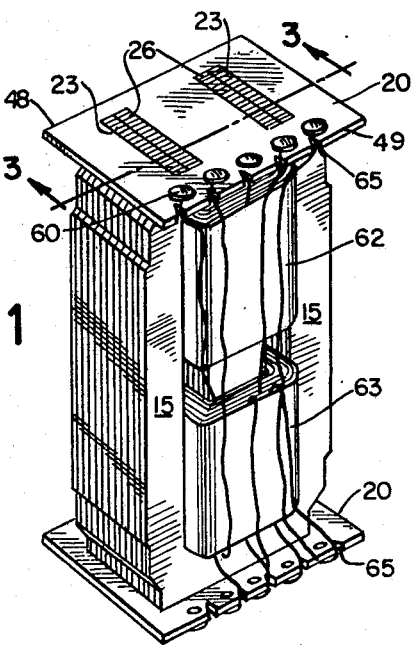
FIG. 2 is a perspective view of the transformer and clamp of FIG. 1 fully assembled.

Referring to FIGS. 1 and 2, the invention is initially described with respect to a shell-type transformer 10, having a three-piece lamination, a central T member 12 and two outside L members 15. The T member 12 has a cross-head portion 13 and an elongated center leg 14, while the L members 15 each have a long leg 16 generally parallel to the T member center leg and a shorter leg 17. When the transformer is assembled, the sides of the ends of the long legs 16 of the L members abut respective ends of the T-section cross-head while the ends of the shorter legs 17 of the L members abut the sides of the ends of the T member center leg.

As is conventional, these three-piece T–L laminations are made of a suitable metallic material and a stack of them of the desired thickness are assembled together to provide the necessary magnetic flux path and density for one or more transformer coils, such as coils 62 and 63 which are to be located on the elongated center leg 14 of the T member. If desired, magnetic shunts can be located on the long legs 16 of the L members and/or gaps formed on the center leg 14 of the T member to form high reactance flux paths. These are not shown, but they are conventional in the art.

After the transformer coils are positioned on the center leg of the lamination stack, it is necessary to hold the stack tightly together, so that the desired magnetic flux density can be produced and also so that there is no noise produced by eddy currents and other effects acting on loose laminations and lamination pieces. This is accomplished by a clamp 20 located at each end of the lamination stack. In accordance with the invention, the end of each of the long legs 16 of an L member is formed with a recessed portion 22 and an extending portion or tab 23. The head of the T member 12 is formed with a central recessed portion 25 and a raised portion or tab 26 adjacent each end of the cross-head. A similar arrangement exists at the other end of the lamination stack so that a recessed portion 32 and raised portion 33 are formed on the short legs 17 of each L member, while a depressed central portion 35 and a raised tab 36 are formed on the end of the long leg 14 of the T member.

Figure 3:
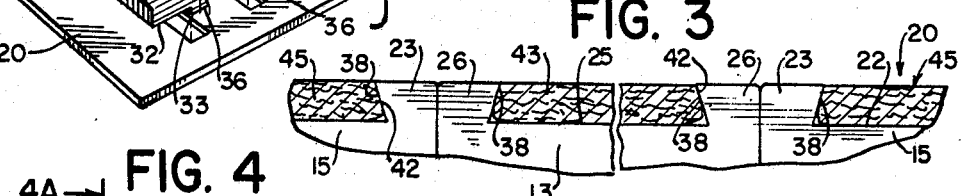
FIG. 3 is a view taken in section through lines 3—3 of FIG. 2, showing a portion of the end of a transformer lamination.

As shown most clearly in FIG. 3, the edges of the respective tabs 23 and 26, and 33 and 36 on the L and T members are adjacent each other when a lamination is assembled. Preferably, tabs 23 and 26 abut along generally straight edges, although this is not absolutely necessary. The outside edge of each tab 23, 26, 33 and 36 also preferably has an inwardly slanting wall 38, this is shown most clearly in FIGURE 3.

The clamp 20 is essentially a frame and is formed with two spaced and generally rectangular openings 42. The openings 42 of an undeformed clamp have a height substantially the thickness of the lamination stack to prevent any movements of the laminations and a width somewhat less than the distance between the inner ends of the inwardly sloping walls 38 of an adjacent pair of tabs 23 and 26, or 33 and 36. The thickness of the clamp is preferably at least the depth of a tab 23, 26, 33, or 36.

The clamp 20 can be made of a suitable material such as metal or plastic which has some elasticity or resiliency across the width of the openings 42. By applying a transverse force the opening can be expanded somewhat so that they can fit over adjacent pairs of tabs. As the expanding force is released the clamp walls on the sides of the openings engage the tab side walls and hold the two pieces of the laminations together.

In a preferred embodiment, the clamp 20 is made of cardboard or fibreboard which does not have any substantial elasticity. Here, it is only necessary to force-fit on opening 42 of a clamp over a pair of adjacent tabs. As shown in FIGS. 1-3, there are two pairs of adjacent tabs 23, 26 on one of the lamination stack, and two pairs of tabs 33, 36 on the other end. Each opening 42 of a clamp fits over a pair of adjacent tabs. This is shown in FIGURE 3, where it is seen that the central portion 43 of clamp 20 between the two openings 42 is wedged in the recessed section 25 of the head 13 of the T member with the side walls of the portion 43 bounding openings 42 engage the sloping walls 38 of the two tabs 26. The outer portions 45 of the clamp bounding the outside of the opening 42 are wedged against the sloping walls 38 of the tabs 23. The side walls of each opening 42 hold a pair of adjacent tabs 23 and 26 together and the tab size and opening locations are positioned to make the adjacent pieces of the lamination butt together and hold them in alignment. The material and outer dimensions of the clamp 20 are selected to have sufficient strength to hold the lamination stack together. Thus, the cross-head of the T members and the long legs of the L members are held securely together. The clamp 20 on the other end of the lamination stack holds the short legs of the L members and the long leg of the T member securely together. Thus, the entire stack is held securely together by the two simple frame-type clamps.

An arrangement such as shown in FIGS. 1-3 is preferred wherein the width of each of the abutting tabs 23, 26 is relatively small. This permits the surrounding frame portions to be larger, thereby providing greater strength for the clamp. More importantly, the use of relatively small adjacent tabs minimizes the possibility that any piece of a lamination will be forced out of the common plane, i.e. twisted, buckled, or cocked, to cause mis-alignment of two or more of the pieces of a lamination. As shown in FIG. 3, the force fit of the clamp over each abutting pair of tabs confines the holding force generally in the same plane for all pieces of a lamination. The tabs 23 and 26 on the laminations are also preferably made of the same size.

The portions 48 and 49 of the clamp 20 which lie generally transverse to the portions 43 and 45 also serve a useful purpose. The transformer can be mounted in a housing on the portions 48 of the two clamps which serve as feet and also space the coils and core a predetermined distance from the bottom of the housing so that potting compound can be flowed under the transformer. Also, terminals 60 can be mounted on the opposite portion 49 of one or both clamps so that the wires of the transformer coils and/or transformer lead wires can be connected directly thereto. Thus, in addition to holding the laminations together the clamps eliminate the need for separate terminal boards and housing spacers.

FIG. 2 shows the clamps 20 on a fully assemble transformer. Here the coils 62 and 63 are located on the center leg 14 of the T member and the coil leads are connected to the clamp terminals 60. A number of slits 65 provide access to terminals located on the outside of a clamp. During assembly, the coils 62 and 63 are slipped onto the long leg 14 of the T member and the clamps 20 are then applied. The clamps and laminations are then preferably coated with a suitable insulating varnish which further increases the holding power of the clamps.

Figure 4:
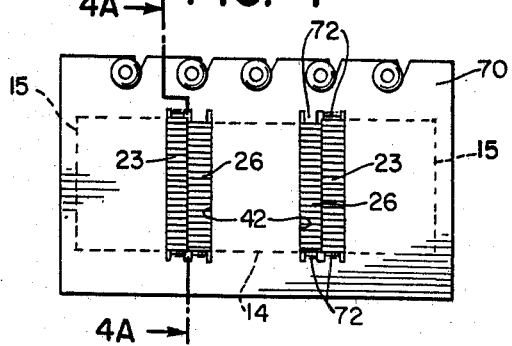
FIGS. 4 and 4A are end and side views, the latter taken in section, of a portion of a transformer showing another embodiment of the clamp.
Figure 4A:
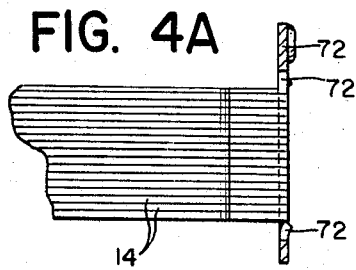

FIGS. 4 and 4A show another embodiment of the invention with a three-piece lamination. As is known, the stacks of the pieces of laminations do not always end up with the same height during manufacture of a transformer. Thus, as shown in FIG. 4 the height of the stack of the T center pieces 14 may be somewhat less, perhaps in the order of the thickness of one lamination, than the height of one of the stacks of the L legs 15. Usually the pieces of the bottom laminations are all aligned since they are assembled on a flat plate or die.

The unevenness of height is compensated for by the use of a clamp 70 which is modified slightly from the clamp 20 of FIG. 1. Here, one end of each window 42 is cut with a pair of downwardly extending pieces 72, each of which is aligned with the tabs on a stack of T or L pieces 14 or 15. The thicker the particular stack, the more a piece 72 is bent forward. As should be apparent, the pieces 72 provide an arrangement for securely holding the top and bottom of each stack of laminations, even if adjacent stacks have different heights.

It should be understood that while the embodiments of FIGS. 1-4 show a single clamp with two windows for holding two sets of abutting tabs together, that a separate clamp can be used for each set of abutting tabs. For example, the clamps 20 and 70 can be split at their middle or some other suitable place.

Figure 5:
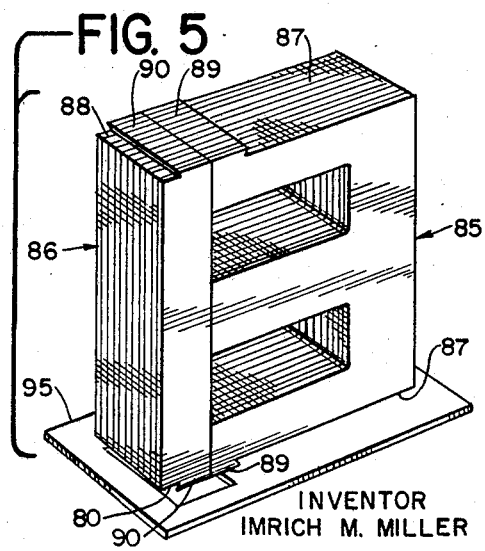
FIG. 5 is a perspective view of still another type of transformer lamination.

FIG. 5 shows another embodiment of the invention in which the transformer lamination is formed by an E member 85 and an I member 86. The outer edge of the I member 86 has a recessed portion 88 and a tab portion 90. The E member has a recessed portion 87 which extends a substantial distance across the top and bottom of the outer legs of the E and a tab portion 89. As in FIGS. 1-4 the tabs 89 and 90 abut each other and they preferably are of equal size. A single opening frame type clamp 95 is utilized at each end of the transformer to hold the stack of transformer lamination members abutting one another.

While preferred embodiments of the invention have been described above, it will be understood that these are illustrative only, and the invention is to be limited solely by the appended claims.

What is claimed is:

1. In combination with an inductive device having a stack of laminations, each said lamination formed by first, second, and third lamination members, said first and third lamination members having a recessed portion and a tab portion one one edge thereof and said second lamination member having a tab portion on each edge thereof with a recessed portion in between, the laminations being arranged so that the tab portions of said first and third members lie adjacent a respective tab portion of said second member, a clamp for holding the stack of laminations together with the tabs of the first and second and the second and third members in an abutting relationship, said clamp being substantially flat and formed with side walls, top and bottom walls and an intermediate wall defining two openings whose respective widths are each normally less than the total width of two tabs of a lamination when in an abutting relationship, said clamp being placed over the tabs of the laminations of the stack with the side walls and the intermediate wall of the clamp lying in said recesses and the edges of said side and intermediate walls engaging and holding the outer edges of the tabs of the laminations to bring the tabs into an abutting relationship with the clamp lying flat, a pair of resilient fingers extending from the top wall into each of said window openings, each finger adapted to rest on one of the tabs of one of the adjacent top lamination members to exert a force on said tab and the tabs of the corresponding lamination member below it so as to tend to keep each of said lamination members of the stack in a generally horizontal position.

2. The combination of claim 1, a pair of fingers extending upwardly from the bottom wall of said clamp into each said window, each finger engaging the corresponding tab on the lowermost lamination of the stack adjacent to it.

References Cited

UNITED STATES PATENTS

| | | | |
|---|---|---|---|
| 1,628,398 | 5/1927 | Casper et al. | 336—210 XR |
| 1,690,154 | 11/1928 | Alden | 336—210 |
| 2,610,225 | 9/1952 | Korski | 336—210 |
| 2,882,506 | 4/1959 | Brooks et al. | 336—210 |
| 3,169,235 | 2/1965 | Ouletta | 336—210 |
| 3,222,626 | 12/1965 | Feinberg et al. | 336—210 |
| 3,387,245 | 6/1968 | Czernobil | 336—192 |

LEWIS H. MEYERS, Primary Examiner

H. J. KOZMA, Assistant Examiner

U.S. Cl. X.R.

336—192